United States Patent [19]
del Pilar Pla Rodriguez et al.

[11] Patent Number: 5,156,284
[45] Date of Patent: Oct. 20, 1992

[54] THERMALLY INSULATED BABY BOTTLE

[76] Inventors: Maria del Pilar Pla Rodriguez; Ramon A. G. Machado, both of Cond. Hato Rey Apt. 901, Urb. Pinero, Hato Rey, 00917

[21] Appl. No.: 858,944

[22] Filed: Mar. 27, 1992

[51] Int. Cl.⁵ .................................................. A61J 9/08
[52] U.S. Cl. .................................... 215/11.6; 215/13.1; 215/356
[58] Field of Search ............... 215/11.1, 11.6, 12.1, 215/13.1, 356

[56] References Cited

U.S. PATENT DOCUMENTS

| | | | |
|---|---|---|---|
| 922,174 | 5/1909 | Lyman | 215/13.1 X |
| 1,221,335 | 4/1917 | Kline | 215/11.6 X |
| 1,415,908 | 5/1922 | Tofting | 215/356 |
| 1,694,967 | 12/1928 | Collidge | 215/13.1 |
| 3,530,979 | 9/1970 | Merrill, Jr. et al. | 215/11.6 X |
| 3,661,288 | 5/1972 | Noll | 215/11.1 |
| 4,215,785 | 8/1980 | Schwaiger | 215/11.6 |
| 5,038,948 | 8/1991 | Signorini | 215/11.1 |
| 5,044,509 | 9/1991 | Petrosky et al. | 215/11.6 X |
| 5,069,351 | 12/1991 | Gunderson et al. | 215/11.1 |

FOREIGN PATENT DOCUMENTS

| | | | |
|---|---|---|---|
| 0207045 | 1/1960 | Austria | 215/11.1 |
| 0454086 | 1/1949 | Canada | 215/11.6 |
| 1093352 | 5/1955 | France | 215/11.1 |
| 1103010 | 10/1955 | France | 215/11.6 |

*Primary Examiner*—Allan N. Shoap
*Assistant Examiner*—Stephen Cronin
*Attorney, Agent, or Firm*—Malloy, Downey & Malloy

[57] ABSTRACT

A thermally insulated baby bottle assembly constructed to keep liquid contents at an initial hot or cold temperature for extended periods of time, the assembly including a multi-wall container having an axially disposed transparent window for visual observation of the contents therein, a spill-proof plug, and an attachable nipple, nipple cap, and protective nipple cover to allow safe portability and subsequent, facilitated feeding to infants.

6 Claims, 1 Drawing Sheet

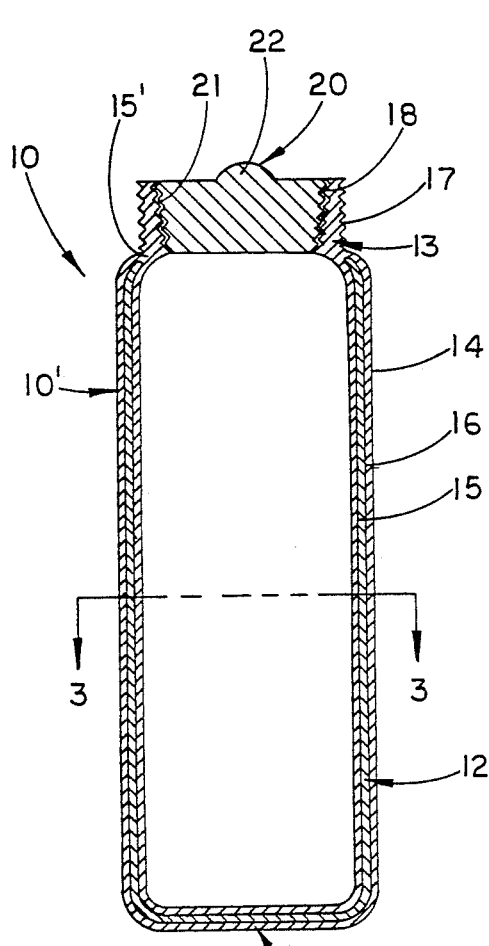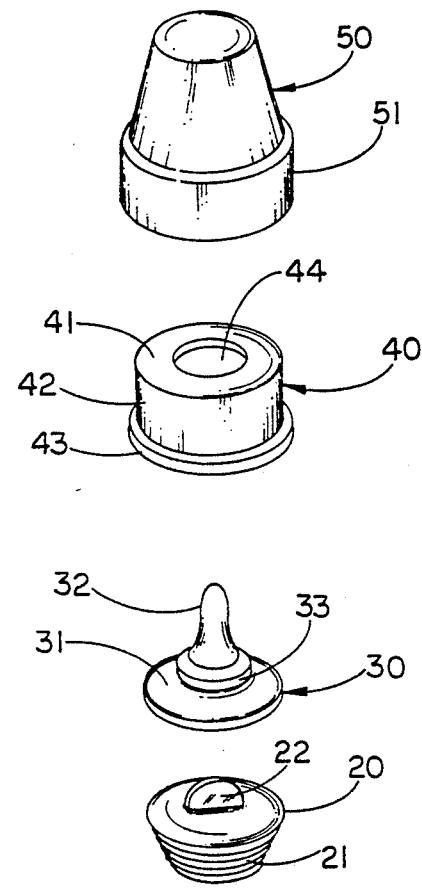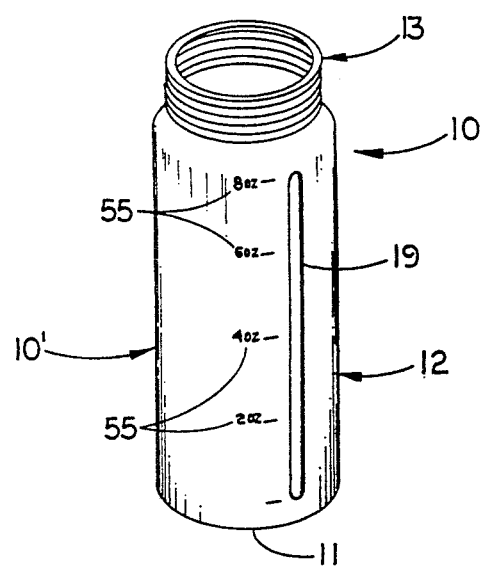

THERMALLY INSULATED BABY BOTTLE

BACKGROUND OF THE INVENTION

1. Field of the Invention

The present invention relates to a baby feeding bottle, and more particularly, to a sealable, thermally insulated baby bottle assembly to be used to keep liquid contents hot or cold for extended period of time, thereby providing a user with a safe and effective means of transporting the hot or cold liquids.

2. Description of the Prior Art

Conventional baby feeding bottles consist primarily of a glass or clear plastic body, nipple, and a nipple cap which screws onto the open end of the body such that filling of the bottle and serving to an infant must be done within a short time. Thermally insulated baby bottles generally consist of glass thermos or vacuum-type insulated bottles, and although the liquid contents are kept hot or cold, portability is limited in that the thin-walled glassware is fragile. A typical example is disclosed by U.S. Pat. No. 4,215,785. Representative of thermally insulated bottles made out of plastic is U.S. Pat. No. 3,661,288 but this reference does not employ a conventional nipple or prevent spilling by use of a removable plug.

Applicant's invention is designed specifically to overcome the shortcomings of the prior art by providing for the longstanding need of a baby bottle which will keep its content cold or hot, does not include hazardous or breakable insulating material, enables the contents of the container to be readily visible, and is specially adapted for safe, spill-free sealability and transport.

SUMMARY OF THE INVENTION

The present invention relates to a thermally insulated baby bottle assembly that is spill-proof, self-contained, and durable, thereby allowing feeding at a later desired time and location. The bottle baby assembly includes primarily a container having a surrounding wall structure, a base integrally formed therewith, and an open upper end. The surrounding wall structure and base portion include an outer wall and an inner wall disposed in spaced apart relation from one another and contain insulating materials therebetween. The outer wall and inner wall have an adjoining upper rim adjacent the open end which functions to contain the insulating material between the outer wall and the inner wall. Further included in the surrounding wall structure is a transparent, elongate, axially disposed window which is structured and disposed to allow the quantity of liquid within the container to be visible from outside the container. In order to ensure that the contents of the container are securely held, a removable plug which fits into the open upper end is included. The removable plug has a raised tab protruding from an upper surface thereof, and includes a threaded exterior surface structured and disposed to engage a threaded interior surface of the open upper end. Further included for secured attachment about the outer surface of the open upper end of the container is a nipple cap having a flat top surface, an integrally formed annular skirt structured and disposed to conform with the outer surface of the open upper end, and a concentrically positioned aperture in the flat top surface which is positioned so as to receive therethrough a nipple having a base flange and at least one smaller concentrically raised circular surface from which upwardly extends a nursing portion.

The principal object of the invention is to provide a baby bottle which keeps the liquid contents hot or cold, preventing milk or infant formula from spoiling, for extended periods of time before consumption by an infant.

Another object of the invention is to provide a baby bottle with means for sealing the open end of the bottle with a removable spill-proof plug such that leakage will not occur during transportation.

Another object of the invention is to provide a baby bottle with a see-through window axially along the length of the bottle, and graduation markings corresponding to the fluid volume contents therein, thereby allowing for either quick preparation of infant formulas or determination of remaining contents in bottles of various colors or artistical decors.

Another object of the invention is to provide a baby bottle having means for attachment of a nipple, nipple cap and protective cover so that no additional items are required for serving the contents to infants.

A further object of the invention is to provide a baby bottle which is safe and non-breakable.

Various other objects and advantages of the present invention will be readily apparent from the following description.

BRIEF DESCRIPTION OF THE DRAWINGS

For a fuller understanding of the nature of the present invention, reference should be had to the following detailed description taken in combination with the accompanying drawings in which:

FIG. 1 is an exploded pictorial view of the thermally insulated baby bottle assembly.

FIG. 2 is a longitudinal sectional view of the thermally insulated baby bottle assembly showing the spill-proof plug in the sealed position.

FIG. 3 is a cross-sectional view taken substantially along line 3—3 of FIG. 2 showing the see-through window.

DETAILED DESCRIPTION OF THE PREFERRED EMBODIMENT

The drawing figures show one embodiment of the invention which at the time of filing constituted the best known mode for carrying out the invention.

Referring first to FIG. 1, the illustrated embodiment comprises a thermally insulated bottle generally indicated as 10. The bottle 10 includes an elongate container 10', a spill-proof plug 20, a nipple 30, a nipple cap 40 and a nipple cover 50.

With reference to FIG. 2, the elongate container 10', preferably made of food-safe plastic, includes a base portion 11, surrounding wall structure 12, and an open upper end 13. The base 11 and the wall structure 12 further consist of an outer wall 14 and an inner wall 15 with an insulating material 16 therein, such as styrofoam. The outer wall 14 and the inner wall 15 are connected at an adjoining upper rim 15", adjacent the open upper end 13.

Referring now to FIG. 3, there is illustrated a sectional view of the thermally insulated bottle 10 shown in FIG. 2. A substantially clear window 19 is made by removing a thin section of the insulating material 16 axially along the length of the container 10'. Additionally, fluid measurements, such as ounces 55, best seen in FIG. 1, are imprinted, embossed, or printed corresponding to the contents therein.

With reference again to FIG. 2 and more specifically the open upper end 13 and removable plug 20, the open end contains locking means with the removable plug 20. Preferably, external threads 21 on the removable plug 20 mate with the internal threads 18 on the inside of the open upper end 13. The open upper end 13 in the preferred embodiment contains internal threads 18 which are substantially angled, and which mate with the substantially angled external threads 21 of the removable spill-proof plug 20. For facilitating removal of the threaded plug 20 a raised tab 22 extends from the top surface thereof.

The nipple 30 is a conventional baby bottle nipple, such as manufactured by the Pyramade Rubber Co., and sold under the trademark "Evenflo" and advertised as being patented in the United States. Such nipple 30 includes a flat base or flange 31, adapted to the open upper end 13 of the container 10', an upstanding nursing portion 32, and a plurality of smaller concentrically raised circular surfaces or holding lugs 33 spaced about the base of the nursing portion 32.

The nipple cap 40 is formed with a generally flat disk top 41 having a central aperture 44 sized and configured to accept the circumferentially spaced lugs 33 of the nipple 30. The disk top 41 has an integrally molded annular skirt 42 with internal threads (not shown in FIG. 1) that mate with the external thread 17 of the open upper end 13. The lower edge of the molded annular skirt 42 contains a raised boss 43.

The nipple cover 50 is substantially domed shaped such that it is generally spaced apart from the exterior of the nipple 32, and contains an integral lower skirt portion 51 that contains means for attachment onto the nipple cap 40. More specifically, a relief on the inside of the skirt 51 for mating with the raised boss 43 on the nipple cap 40.

Now that the invention has been described,
What is claimed is:

1. A thermally insulated baby bottle assembly comprising:
    a container including a surrounding wall structure, a base integrally formed therewith, and an open upper end,
    said surrounding wall structure and said base portion including an outer wall and an inner wall disposed in spaced apart relation from one another and having insulating material therebetween and an adjoining upper rim adjacent said open end,
    said surrounding wall structure further including a transparent, elongate, longitudinally disposed window structured and disposed to allow a level of liquid within said container to be visible from outside said container,
    a removable plug including a raised tab protruding from an upper surface thereof and a threaded exterior surface, said plug being structured and disposed to matingly engage a threaded interior surface of said open upper end,
    a nipple including a base flange from which upwardly extends a nursing portion,
    a collar including a flat top surface having a concentrically positioned aperture therein for acceptance of said nursing portion of said nipple therethrough, and including an integrally formed annular skirt structured and disposed to conform with an outer surface of said outer open end, and
    attachment means to secure said outer surface of said open upper end of said container with an inner surface of said annular skirt of said collar.

2. A bottle assembly as recited in claim 1 wherein said attachment means includes a threaded inner surface of said annular skirt structured and disposed for contacting and mating engagement with a threaded outer surface of said open upper end of said container.

3. A bottle assembly as recited in claim 2 further including a nipple cover, said nipple cover having a substantially dome shape and being structured and disposed to cover said nipple.

4. A bottle assembly as recited in claim 3 wherein said collar further includes a raised boss along an outer surface of said annular skirt for contacting and mating engagement with a corresponding relief on a lower inside surface of said nipple cover.

5. A bottle assembly as recited in claim 4 wherein said container includes a plurality of content markings printed on said outer wall structure and disposed adjacent said window.

6. A bottle assembly as recited in claim 5 wherein said exterior surface of said removable plug and said interior surface of said open upper end are congruently configured.

* * * * *